United States Patent
Yokota

(10) Patent No.: US 8,694,208 B2
(45) Date of Patent: Apr. 8, 2014

(54) VEHICLE BEHAVIOR CONTROL APPARATUS

(75) Inventor: Takahiro Yokota, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 571 days.

(21) Appl. No.: 12/674,703

(22) PCT Filed: Aug. 25, 2008

(86) PCT No.: PCT/IB2008/002192
§ 371 (c)(1), (2), (4) Date: Feb. 23, 2010

(87) PCT Pub. No.: WO2009/027790
PCT Pub. Date: Mar. 5, 2009

(65) Prior Publication Data
US 2011/0125368 A1 May 26, 2011

(30) Foreign Application Priority Data
Aug. 27, 2007 (JP) ................................. 2007-220344

(51) Int. Cl.
*B62D 11/00* (2006.01)
*B62D 55/02* (2006.01)

(52) U.S. Cl.
USPC .......................................... 701/41; 180/9.38

(58) Field of Classification Search
USPC ............... 701/36, 41, 42, 43, 48, 70, 72, 124; 340/988–996; 180/9.38, 9.44, 12, 19.2, 180/23, 211, 222, 223, 234, 280, 402–426
See application file for complete search history.

(56) References Cited

U.S. PATENT DOCUMENTS

| | | | |
|---|---|---|---|
| 5,351,776 A | 10/1994 | Keller et al. | |
| 5,646,849 A | 7/1997 | Walenty et al. | |
| 5,671,143 A | 9/1997 | Gräber | |
| 5,991,669 A | 11/1999 | Dominke et al. | |
| 6,205,375 B1 | 3/2001 | Naito | |
| 6,278,930 B1 * | 8/2001 | Yamada et al. | 701/82 |
| 6,416,141 B1 | 7/2002 | Zinnkann et al. | |
| 6,572,202 B2 * | 6/2003 | Watanabe | 303/167 |
| 6,654,674 B2 | 11/2003 | Lu et al. | |

(Continued)

FOREIGN PATENT DOCUMENTS

| | | |
|---|---|---|
| EP | 0 507 072 A2 | 10/1992 |
| EP | 1 388 474 | 2/2004 |

(Continued)

OTHER PUBLICATIONS

Decision on Grant issued Dec. 17, 2007 in Russian Application No. 2006126981/11 (English Translation).

(Continued)

*Primary Examiner* — Muhammad Shafi
(74) *Attorney, Agent, or Firm* — Oblon, Spivak, McClelland, Maier & Neustadt, L.L.P.

(57) ABSTRACT

A vehicle behavior control apparatus including a deceleration control mechanism decelerating the vehicle to reduce a deviation between a target turning index value, which is determined based on a steering angle of the vehicle, and an actual turning index value. The deceleration control mechanism reduces the decrease gradient of the deceleration when a roll motion index value of the vehicle exceeds a threshold roll motion index value.

18 Claims, 7 Drawing Sheets

(56) References Cited

U.S. PATENT DOCUMENTS

| | | | |
|---|---|---|---|
| 6,738,697 B2 | 5/2004 | Breed | |
| 7,006,907 B2 | 2/2006 | Usuki et al. | |
| 7,240,971 B2 | 7/2007 | Yasui et al. | |
| 7,308,350 B2 | 12/2007 | Brown et al. | |
| 7,409,280 B2 | 8/2008 | Nakamura et al. | |
| 7,522,983 B2 | 4/2009 | Hashimoto et al. | |
| 7,630,816 B2 * | 12/2009 | Yasutake et al. | 701/72 |
| 7,762,562 B2 | 7/2010 | Sugiyama | |
| 2002/0016659 A1 | 2/2002 | Tashiro et al. | |
| 2002/0082762 A1 | 6/2002 | Tanaka et al. | |
| 2002/0109403 A1 | 8/2002 | Yamamoto et al. | |
| 2002/0183911 A1 | 12/2002 | Tashiro et al. | |
| 2003/0102713 A1 | 6/2003 | Murakami | |
| 2003/0218378 A1 | 11/2003 | Tanaka et al. | |
| 2004/0098185 A1 | 5/2004 | Wang | |
| 2004/0117085 A1 | 6/2004 | Lu et al. | |
| 2005/0027402 A1 | 2/2005 | Koibuchi et al. | |
| 2005/0029754 A1 | 2/2005 | Ueno et al. | |
| 2005/0075778 A1 | 4/2005 | Inagaki | |
| 2006/0267404 A1 | 11/2006 | Yasui et al. | |
| 2007/0112498 A1 | 5/2007 | Yasutake et al. | |
| 2007/0138861 A1 | 6/2007 | Kawahara et al. | |
| 2007/0169007 A1 | 7/2007 | Hashimoto et al. | |
| 2007/0213900 A1 | 9/2007 | Raab | |
| 2007/0282510 A1 | 12/2007 | Nimmo et al. | |
| 2008/0007115 A1 | 1/2008 | Mizutani | |
| 2008/0215223 A1 | 9/2008 | Yamada et al. | |
| 2008/0300764 A1 | 12/2008 | Kato et al. | |
| 2009/0012685 A1 | 1/2009 | Maeda et al. | |
| 2009/0051216 A1 | 2/2009 | Maeda et al. | |
| 2009/0072615 A1 | 3/2009 | Oosawa et al. | |
| 2009/0118905 A1 | 5/2009 | Takenaka et al. | |
| 2010/0106374 A1 | 4/2010 | Miyajima et al. | |
| 2011/0125368 A1 | 5/2011 | Yokota | |
| 2011/0130923 A1 | 6/2011 | Watanabe | |
| 2011/0241418 A1 | 10/2011 | Nozawa et al. | |
| 2011/0246041 A1 | 10/2011 | Kato | |
| 2012/0074700 A1 | 3/2012 | Ciszak et al. | |

FOREIGN PATENT DOCUMENTS

| | | | |
|---|---|---|---|
| EP | 1 495 931 | | 1/2005 |
| GB | 2 318 106 A | | 4/1998 |
| JP | 2-208136 | | 8/1990 |
| JP | 5-85228 | | 4/1993 |
| JP | 10-329689 | | 12/1998 |
| JP | 11 255093 | | 9/1999 |
| JP | 2000 52963 | | 2/2000 |
| JP | 2000 168524 | | 6/2000 |
| JP | 2000-344077 | | 12/2000 |
| JP | 2001 47989 | | 2/2001 |
| JP | 2002-36919 | | 2/2002 |
| JP | 2002-173014 | | 6/2002 |
| JP | 2003-191774 | | 7/2003 |
| JP | 2004 25916 | | 1/2004 |
| JP | 2004-114794 | | 4/2004 |
| JP | 2006 193038 | | 7/2006 |
| JP | 2006-213141 | A | 8/2006 |
| JP | 2006-240395 | A | 9/2006 |
| JP | 2006-298211 | A | 11/2006 |
| JP | 2007-513002 | A | 5/2007 |
| RU | 2 104 883 | C1 | 2/1998 |
| WO | 2005 063537 | | 7/2005 |
| WO | WO 2006/006453 | A1 | 1/2006 |
| WO | WO 2006/093246 | A1 | 9/2006 |

OTHER PUBLICATIONS

Office Action issued Jul. 31, 2007 in Japanese Application No. 2003-430233 (Partial English Translation).

Office Action mailed Aug. 15, 2008 in co-pending U.S. Appl. No. 10/583,661.

Office Action issued Dec. 1, 2008 in Japanese Application No. 2007-003732.

Yoshihisa Harata, et al., "A simplified Serial Communication Network Within a Vehicle", Toyota Central Research and Development Labs, May 1, 1989, pp. 437-442.

U.S. Office Action mailed Apr. 12, 2012 in co-pending U.S. Appl. No. 13/001,153.

U.S. Notice of Allowance mailed Dec. 26, 2012 in U.S. Appl. No. 13/133,535.

U.S. Office Action mailed Oct. 19, 2012 in co-pending U.S. Appl. No. 13/001,153.

Office Action issued May 29, 2012 in Chinese Patent Application No. 200880105087.1 (with English translation).

* cited by examiner

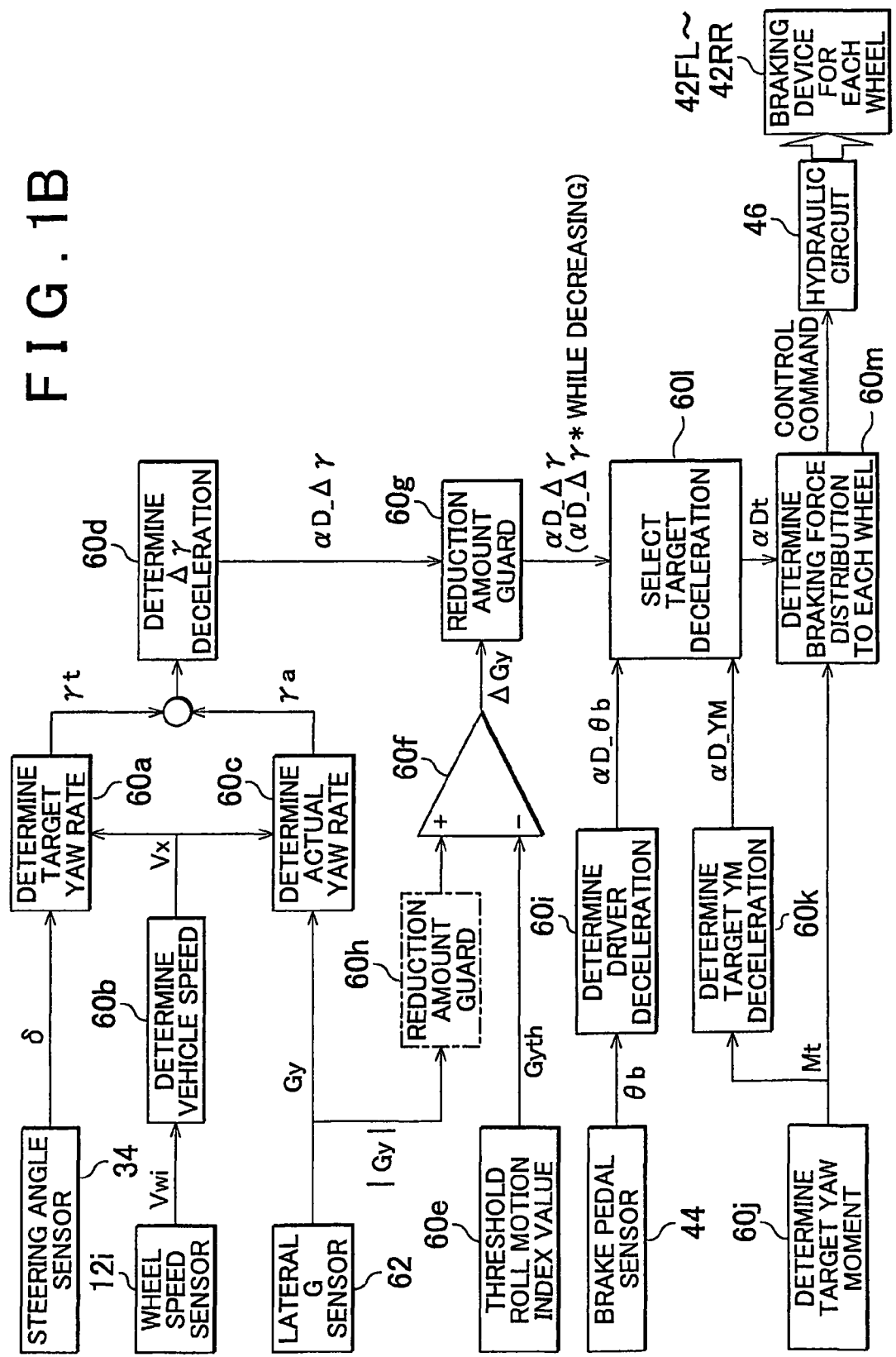

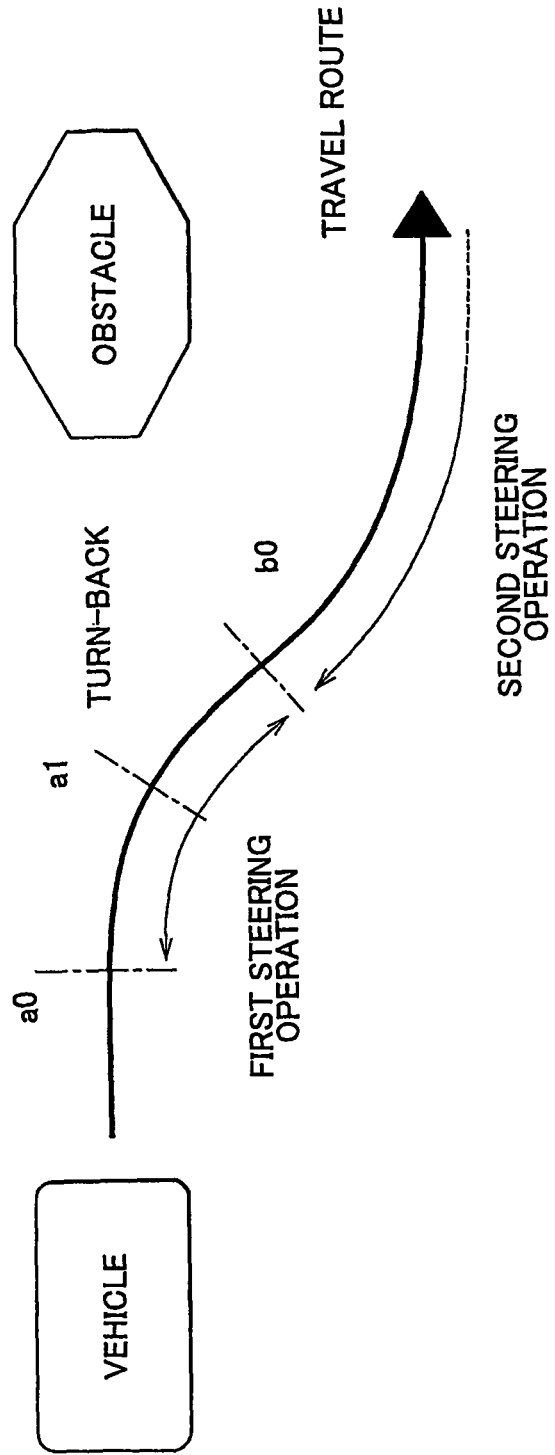

VEHICLE BEHAVIOR CONTROL APPARATUS

BACKGROUND OF THE INVENTION

1. Field of the Invention

The present invention relates to a vehicle behavior control apparatus, which stabilizes the behavior of a vehicle such as an automobile while the vehicle is in motion, and more particularly to an apparatus that executes deceleration control to reduce the speed of the vehicle in order to avoid excessive rolling of the vehicle or to prevent the vehicle from overturning during steering of the vehicle.

2. Description of the Related Art

If a comparatively large centrifugal force acts on the center of gravity of a vehicle when the vehicle is steered, yaw direction behavior of the vehicle is likely to become more unstable than in a normal turn. In certain cases, the rolling behavior of the vehicle may also become unstable, for example when excessive rolling is generated in a direction an upper portion of the center of the gravity of the vehicle moves toward the outer side of the turn, leading to an increase in the possibility of the vehicle overturning. Accordingly, various deceleration control techniques and behavior control techniques for stabilizing the yaw direction behavior of the vehicle and suppressing rolling of the vehicle by reducing the speed of the vehicle during a turn in order to reduce the centrifugal force acting on the vehicle have been proposed and put to practical use.

For example, Japanese Patent Application Publication No. 2000-52963 (JP-A-2000-52963) describes a technique for directly suppressing rolling in a vehicle during a turn in which a lateral acceleration threshold (rollover threshold acceleration) for preventing the vehicle from overturning is estimated from the state of the vehicle during a turn, and a target deceleration (as well as a target yaw moment) of the vehicle is determined in consideration of the overturning rollover threshold acceleration.

In certain cases during a control to stabilize the turning behavior of a vehicle following a rapid turn-back steering in a large steering angle, it is not possible to suppress yaw/roll variation in the vehicle when a generated yaw moment varies in the vicinity of a limit value at which a wheel lateral force required to realize a target lateral acceleration corresponding to a target yaw rate (determined based on quantities of state such as the steering angle and the vehicle speed) can be realized at the frictional characteristic of the current road surface (in other words, a generated yaw moment may vary such that at certain times the target lateral force value is realizable and at other times the target lateral force value is unrealizable). In response to this problem, Japanese Patent Application Publication No. 2006-193038 (JP-A-2006-193038) describes a technique for stabilizing the yaw/roll behavior of a vehicle during a turn in which a controlled variable (a control force of a turn outer wheel) of an actuator (for example, a braking force control unit for each wheel) that generates the yaw moment is modified in accordance with a determination as to whether the target lateral acceleration can be realized at the frictional characteristic of the current road surface.

Further, Japanese Patent Application Publication No. 2000-168524 (JP-A-2006-168524) describes a vehicle behavior stabilization control for use during emergency steering in which the braking force of each wheel is controlled (a yaw moment is generated) during emergency steering so that yaw direction behavior of the vehicle shifts to a direct advancement state, for example, thereby preventing the behavior of the vehicle from becoming unstable due to excessive steering by a driver when a yaw rate control response is delayed.

In behavior control (or deceleration control) for decelerating a vehicle in order to stabilize yaw behavior and suppress excessive rolling during steering or a turn, an index value (to be referred to hereafter as an "actual turning index value") representing the actual turning state of the vehicle, i.e. the yaw rate, lateral acceleration, and so on, is typically compared with a target value of the turning index value (in this case, a requested value corresponding to the steering of the driver, which is calculated based on quantities of variables such as the steering angle and the vehicle speed; to be referred to hereafter as a "target turning index value"), and when the magnitude of the target turning index value is greater than the magnitude of the actual turning index value, control is performed to increase the deceleration of the vehicle. When the magnitude of the target turning index value is greater than the magnitude of the actual turning index value, the centrifugal force generated by the turn request issued by the driver is excessive in light of the current speed of the vehicle, and therefore rolling that biases the upper portion of the center of gravity of the vehicle toward the outer side of the turn may increase.

Hence, in the control described above, the vehicle is decelerated in accordance with the deviation between the target turning index value and the actual turning index value, thereby reducing the vehicle speed such that the centrifugal force acting on the vehicle decreases, the yaw behavior is stabilized, and the possibility of a rollover is reduced. In other words, in this deceleration control, the vehicle behavior is stabilized by controlling the vehicle speed so that the turning state requested by the driver conforms to an actually achievable turning state.

However, if the deceleration control is executed on an actual vehicle in accordance with the deviation between the target turning index value and the actual turning index value, as described above, the deviation between the target turning index value and the actual turning index value may decrease temporarily due to a response delay in the actual steering angle of the vehicle (or the actual turning index value) relative to the steering performed by the driver when the steering speed of the driver is comparatively high, the steering angle is large, or the steering direction is switched comparatively quickly (for example, during a sharp turn, during emergency steering to change lanes in order to avoid a frontward obstacle, and so on), and as a result, the vehicle may not be possible to achieve sufficient deceleration.

As shown in FIG. 5A, for example, when a driver executes a lane-change in an actual vehicle by manipulating the steering angle such that the target turning index value varies as shown by the solid line in FIG. 5B, and this variation is rapid, the actual turning index value of the vehicle displaces at a delay relative to the target turning index value, as shown by the dotted line in the drawing. Hence, in this case, a response delay occurs in the actual turning index value when a turn-back is performed (a1 to b0 in the drawing) during a first steering operation (a0 to b0 in the drawing), which reduces the deviation between the target turning index value and the actual turning index value, and as a result, the deceleration to be applied to the vehicle decreases based on the deviation. When the vehicle speed has not decreased sufficiently at the start of a second steering operation for turning the vehicle in the opposite direction (b0 onward), the vehicle body is jolted back and greater centrifugal force than that of a normal steering operation acts on the vehicle. As a result, the yaw behavior of the vehicle is likely to become unstable and increased body roll is likely to occur.

SUMMARY OF THE INVENTION

The present invention provides a vehicle behavior control apparatus that executes deceleration control in accordance with the deviation between a target turning index value and an actual turning index value, a reduction in the deceleration of the vehicle caused by a response delay in the actual turning index value relative to the target turning index value, which occurs during a sharp turn or when the steering speed or the steering angle is comparatively large, is suppressed, and as a result, the stability of the vehicle is improved.

Further, the present invention is constituted such that in the vehicle behavior control apparatus described above, a reduction in the deceleration of the vehicle is suppressed when centrifugal force acting on the vehicle, the vehicle speed during a turn, or the roll motion of the vehicle is excessive, and as a result, the stability of the vehicle is improved.

A first aspect of the present invention relates to a vehicle behavior control apparatus, including deceleration control means for decelerating a vehicle to reduce the deviation between a target turning index value, which is determined based on a steering angle of the vehicle, and an actual turning index value of the vehicle. In the vehicle behavior control apparatus according to this aspect, when a roll motion index value of the vehicle exceeds a threshold roll motion index value is smaller than that the decrease gradient when the roll motion index value does not exceed the threshold roll motion index value.

Thus, according to the first aspect, the "turning index value" may be an arbitrary quantity that represents the turning state of the vehicle, similarly to the related art, which is constituted by one or a combination of a yaw rate of the vehicle, a wheel angle, and lateral acceleration.

The "target turning index value" of this specification is a value that may be determined based on the steering angle of the vehicle, the vehicle speed, or another appropriate parameter, and indicates the turning index value to be generated in the current state of the vehicle when a steering angle is input into the vehicle.

The "actual turning index value" is a turning index value (corresponding to the target turning index value) that is actually detected or estimated of the vehicle. Hence, in a basic operation of the control apparatus according to the present invention, as described in the "related art" section, the vehicle is decelerated when a deviation exists between the target turning index value and the actual turning index value, thereby reducing the vehicle speed so that the expected turning state relating to the steering input into the vehicle conforms to the actual turning state of the vehicle, or in other words such that the input into the vehicle is not unmanageable.

As described above, however, a response delay in the actual turning index value relative to variation in the target turning index value is not taken into account in the above deceleration control based on a deviation between the target turning index value and the actual turning index value, and therefore deceleration may be reduced due to the response delay in the actual turning index value even when the vehicle speed has not been reduced sufficiently such that excessive centrifugal force may act on the vehicle. Hence, in the control apparatus according to the aspect described above, when a roll motion index value of the vehicle is large, or in other words when the roll motion index value of the vehicle exceeds a threshold roll motion index value that may be set at an appropriate value, the magnitude of the decrease gradient of the deceleration is reduced (i.e. the magnitude of the deceleration is made less likely to decrease) in comparison with a case in which the roll motion index value does not exceed the threshold roll motion index value. As a result, the deceleration control is corrected such that deceleration of the vehicle continues for a longer time period than normal (i.e. when the roll motion index value does not exceed the threshold roll motion index value).

In the aspect described above, it is to be understood that the roll motion index value is basically a value that is referenced to determine the magnitude of the centrifugal force acting on the center of gravity of the vehicle. In other words, the roll motion index value is an arbitrary value that is referenced to determine the danger of the vehicle rolling over during a turn. Accordingly, the roll motion index value may be at least one of the lateral acceleration of the vehicle, a vertical load difference or a vertical load ratio between the left and right wheels of the vehicle, a roll angle of the vehicle, a roll rate, the steering angle (generated by the driver), and the steering angle velocity, all of which are actually detected or estimated in the vehicle, or a value selected from a group consisting of the target turning index value, the actual turning index value, and the deviation therebetween. The steering angle, the steering angle velocity, and the target turning index value in particular are quantities that relate to a turn request issued to the vehicle, and therefore these values may be used to estimate, based on the steering input of the driver, whether the centrifugal force will become excessive before a centrifugal force response to the steering input is actually generated.

Further, the roll motion index value is basically an instantaneous value, and may therefore decrease transiently. In this case, the possibility of excessive centrifugal force acting on the vehicle body may be overlooked. Hence, the roll motion index value, which is referenced to determine the magnitude of the centrifugal force, may be a roll motion determination value that is determined so as to increase and decrease together with the magnitude of at least one value selected from the aforementioned group of values representing the roll motion, and a rate of change in the roll motion determination value relative to a rate of change in the selected value may take a value that is reduced when the value selected from the group decreases than when the value selected from the group increases, or in other words a value that is increased together with the value selected from the group but be unlikely to decrease. In this case, the roll motion determination value does not decrease easily even when the value indicating the roll motion directly or indirectly decreases transiently, and therefore a reduction in the possibility of overlooking the danger of excessive centrifugal force acting on the vehicle body is to be expected. (When the value selected from the group increases transiently, the roll motion determination value also increases, but is unlikely to decrease thereafter, and therefore the excessive deceleration of the vehicle may be maintained. However, this is not problematic in terms of the traveling stability of the vehicle.)

One object of determining the roll motion index value or the roll motion determination value is to determine whether to suppress a reduction in the deceleration of the vehicle in order to prevent the vehicle from overturning, and therefore, a threshold roll motion index value of the roll motion index value or the roll motion determination value may be set such that a static rollover threshold acceleration of the vehicle is determined based on a value converted to the unit of the value selected from the various roll motion index values listed above. More specifically, the threshold roll motion index value is preferably set at a lower value than a value corresponding to the static overturning rollover threshold acceleration such that the actual lateral acceleration never reaches the static overturning rollover threshold acceleration.

Deceleration of the vehicle in accordance with the deviation between the target turning index value and the actual turning index value is typically executed when a centrifugal force is excessive in light of the current traveling condition of the vehicle, i.e. when the magnitude of the target turning index value is greater than the magnitude of the actual turning index value, or when it is determined that the vehicle is understeering based on the deviation between the target turning index value and the actual turning index value. However, it should be understood that deceleration of the vehicle may also be executed to safely stabilize yaw behavior when the vehicle is in an oversteer condition.

Further, the vehicle deceleration control of the control apparatus according to the aspect described above may be executed together with behavior control for correcting the behavior of the vehicle by generating a yaw moment. Accordingly, yaw moment control means for controlling the yaw moment of the vehicle based on a target yaw moment determined to stabilize the yaw behavior of the vehicle may also be provided. In this case, the deceleration control means may select a deceleration having the larger magnitude, between the deceleration generated to reduce the deviation between the target turning index value and the actual turning index value and a deceleration (yaw moment generating deceleration) for realizing the target yaw moment, as the deceleration (final target deceleration) to be generated in the vehicle or a deceleration having the largest magnitude, from among the deceleration generated to reduce the deviation between the target turning index value and the actual turning index value, the yaw moment generating deceleration, and a driver-requested deceleration of the vehicle, as the deceleration (final target deceleration) to be generated in the vehicle. It is to be understood that in this case also, the value of the deceleration generated to reduce the deviation between the target turning index value and the actual turning index value is adjusted so as to be unlikely to decrease when the roll motion index value exceeds the threshold roll motion index value, and only then compared to the yaw moment generating deceleration and/or the driver-requested deceleration.

In the vehicle behavior control apparatus according to the aspect described above, when a state in which excessive centrifugal force may be applied arises during deceleration of the vehicle in accordance with the deviation between the target turning index value and the actual turning index value, the deceleration of the vehicle is controlled to become less likely to decrease. Therefore, particularly when the steering direction is switched rapidly, destabilization of the yaw behavior or excessive body roll, which is caused by insufficient deceleration of the vehicle due to a response delay in the actual turning index value relative to the target turning index value, may be avoided. As described in the related art, in conventional behavior control techniques employed during rapid steering, measures are taken to ensure that the lateral acceleration during the turn does not exceed a limit value or that yaw behavior following a switch of steering direction is suppressed by a yaw moment. In other words, these techniques are employed to control the behavior of the vehicle itself. The object of the control according to the present invention, on the other hand, is to reduce the vehicle speed sufficiently when there may be excessive centrifugal force on the vehicle, thereby ensuring that a request relating to the turning state of the vehicle is manageable during yaw and rolling behavior control. Hence, the control concept of the present invention differs from that of the described related art.

Incidentally, whereas conventional vehicle acceleration is performed in accordance with a driver request, the deceleration control of the present invention is executed irrespective of an acceleration request from control of the driver in order to achieve traveling stability in the vehicle by decelerating the vehicle. Therefore, the deceleration control is not executed or extended unnecessarily. With respect to this point: during the control of the present invention, a reduction in the deceleration of the vehicle is preferably delayed when a state in which excessive centrifugal force may be applied is determined to have arisen; but when the roll motion index value does not exceed the threshold roll motion index or in other words when a state in which excessive centrifugal force may be applied is not determined to have arisen, the deceleration of the vehicle is reduced in accordance with the deviation between the target turning index value and the actual turning index value. Thus, situations in which deceleration of the vehicle is unnecessarily extended may be avoided.

Further, in the aspect described above, the decrease gradient of the deceleration when an absolute value of the roll motion index value exceeds the threshold roll motion index value may be smaller than a decrease gradient when the absolute value of the roll motion index value does not exceed the threshold roll motion index value.

The roll motion index value may be a roll motion determination value. The roll motion determination value is preferentially set to increase when the roll motion index value increases but be unlikely to decrease when the roll motion index value decreases.

A second aspect of the present invention relates to a vehicle behavior control apparatus, including deceleration control means for decelerating the vehicle to reduce a deviation between a target turning index value, which is determined based on a steering angle of the vehicle, and an actual turning index value of the vehicle. In the behavior control apparatus, the decrease gradient of the deceleration, when a deviation exists between a roll motion index value of the vehicle and a threshold reference roll index value, is smaller than the decrease gradient, when no deviation exists between the roll motion index value of the vehicle and the threshold reference roll index value.

A third aspect of the present invention relates to a vehicle behavior control method, in which the vehicle is decelerated to reduce a deviation between a target turning index value, which is determined based on a steering angle of the vehicle, and an actual turning index value of the vehicle. In the behavior control method, the decrease gradient of the deceleration when a roll motion index of the vehicle exceeds a threshold roll motion index value is smaller than the decrease gradient when the roll motion index value does not exceed the threshold roll motion index value.

In short, the present invention provides a vehicle behavior control apparatus which executes deceleration control on the vehicle in accordance with a deviation between a target turning index value and an actual turning index value, and in which the deceleration control is corrected based on a roll motion index value of the vehicle (an arbitrary index value that represents the roll motion of the vehicle) so that a decrease in the deceleration caused by a response delay in the actual turning index value relative to the target turning index value is suppressed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1B is a control block diagram of an electronic control unit that embodies the behavior control apparatus according to the present invention;

FIG. 5A shows the travel route of a vehicle during execution of the control of the behavior control apparatus according to an embodiment of the present invention.

DETAILED DESCRIPTION OF AN EMBODIMENT

Figure 1A:
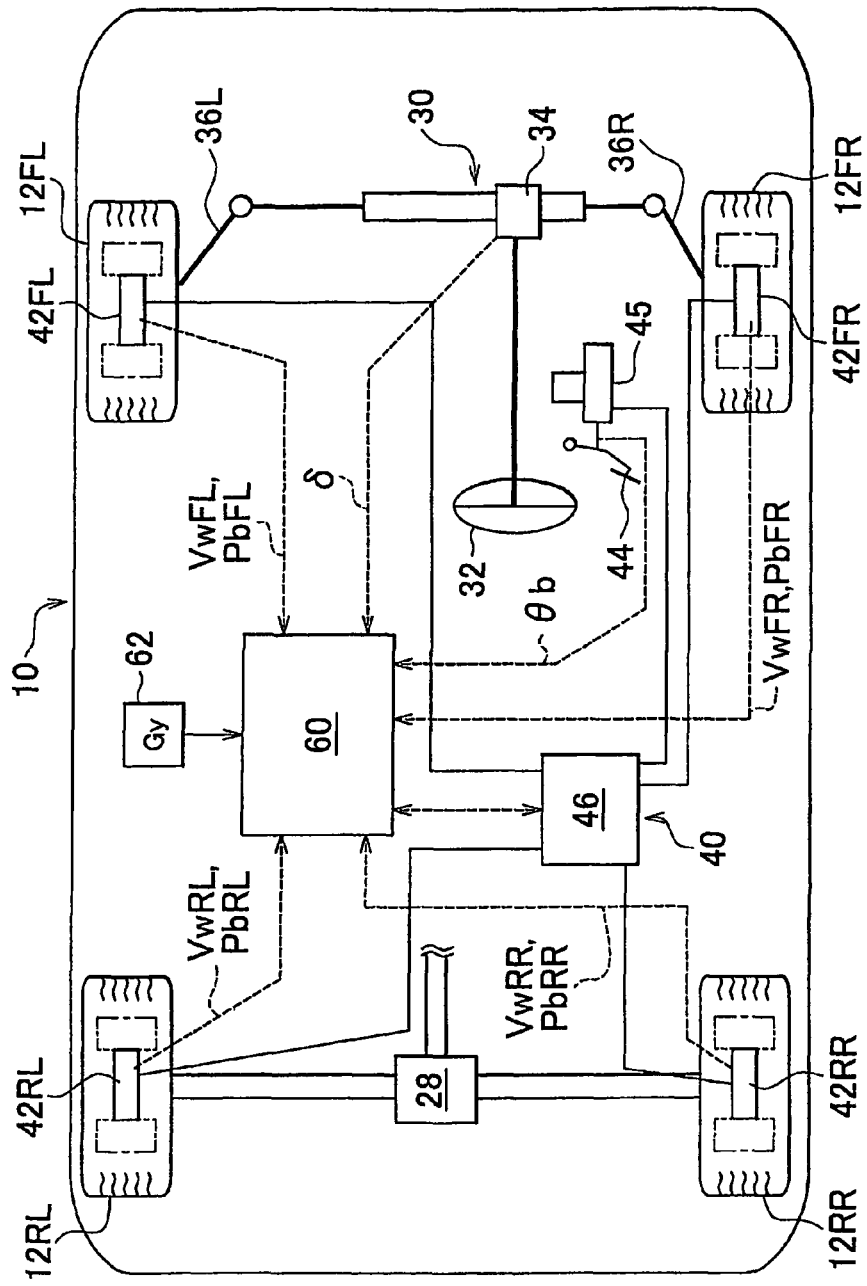
FIG. 1A is a schematic diagram of a vehicle equipped with one embodiment of a behavior control apparatus according to the present invention.

FIG. 1A is a schematic diagram showing the constitution of a vehicle 10 equipped with an embodiment of the behavior control apparatus according to the present invention. The vehicle 10 has left and right front wheels 12FL, 12FR and left and right rear wheels 12RL, 12RR, and is equipped with a driving system device (only a part of which is shown) for generating a braking/driving force in each wheel in accordance with depression of an accelerator pedal, a steering device 30 for controlling the steering angle of the front wheels (a rear wheel device may also be provided), and a braking system device 40 for generating a braking force in each wheel. In the example shown in the drawing, the vehicle is a rear wheel drive vehicle, and therefore the braking/driving force is generated in the rear wheels alone. Normally, the driving system device (only a part of which is shown) transmits drive torque or rotary force from an engine and/or a generator (not shown) to the rear wheels 12RL, 12RR via a transmission (not shown), a differential gear device 28, and so on. Further, the steering device is a power steering device that turns the front wheels 12FL, 12FR by transmitting the rotation of a steering wheel 32 to tie rods 36L, 36R while boosting the rotary force thereof using a boosting device 34.

The braking system device 40 is an electronically controlled hydraulic braking device that adjusts the brake pressure in a wheel cylinder 42$i$ (i=FL, FR, RL, RR, likewise hereafter) provided in each wheel, or in other words the braking force of each wheel, through a hydraulic circuit 46 that communicates with a master cylinder 45 that is operated in response to depression of a brake pedal 44. The hydraulic circuit 46 is provided with various valves (a master cylinder cut valve, an oil pressure maintenance value, and a pressure reduction valve) that connect the wheel cylinder of each wheel to the master cylinder, an oil pump and an oil reservoir (not shown) selectively. During normal operation, the pressure of the master cylinder 45 is supplied to the respective wheel cylinders 42$i$ in response to depression of the brake pedal 44.

However, when the braking force of each wheel is adjusted individually or independently in order to execute the behavior control according to this embodiment or other arbitrary braking force distribution control, the aforementioned various valves are operated based on a command from an electronic control unit 60, whereby the brake pressure in the wheel cylinder of each wheel is controlled to conform to a target pressure based on the brake pressure detected by a pressure sensor provided at each wheel. Note that the braking system device 40 may apply braking force to the wheels as a pneumatic force, an electromagnetic force, or any other form of force known to a person skilled in the art.

Operations of the braking system device 40 are controlled by the electronic control unit 60. The electronic control unit 60 includes a microcomputer having a central processing unit (CPU), read-only memory (ROM), random access memory (RAM), and an input/output port device, which are connected to each other by a bi-directional common bus, and a drive circuit. In this embodiment, detection values such as a brake pedal depression amount θb, a steering angle δ, a wheel speed Vwi, a pressure Pbi in the wheel cylinder of each wheel, and a lateral acceleration Gy 62 are input into the electronic control unit 60 from sensors provided in various portions of the vehicle, but various other parameters required in the various types of control to be executed, for example various detection signals such as a front-rear G sensor value and a yaw rate sensor value, may also be input.

An outline of the control operation will now be described. To suppress destabilization of the yaw behavior of the vehicle and excessive rolling (in a direction for displacing an upper portion of the vehicle toward the outer side of a turn) caused by centrifugal force acting on the vehicle 10 during a turn, the vehicle is decelerated based on a deviation between a target value of an index value (turning index value), which represents a turning state that corresponds to the steering input or a turn request input into the vehicle such as, for example, the yaw rate, the lateral acceleration, and the wheel angle, and the corresponding actual turning index value of the vehicle. As a result, the vehicle speed is reduced so that the state requested of the vehicle 10 conforms to a state that can actually be realized in the vehicle (as will be understood by a person skilled in the art, when the target value (requested value) of the turning index value exceeds the actual value upon application of a certain steering angle, the vehicle speed 10 decreases, leading to a reduction in the centrifugal force, whereby the target value of the turning index value may be expected to decrease so as to conform to the actual value). As shown in FIG. 1A, the steering input into the vehicle 10 corresponds to a steering amount (steering angle δ) of the steering wheel 32. However, when the vehicle 10 is equipped with any automatic steering device, the steering input may correspond to steering command input generated by the automatic steering device.

However, when the steering input into the vehicle varies rapidly in the deceleration control described above, and particularly when the input steering direction is switched rapidly, the magnitude of the deviation between the target turning index value and the actual turning index value appears to decrease due to a response delay in the actual turning index value relative to the target turning index value, and as a result, the vehicle speed is not reduced sufficiently.

Figure 5B:
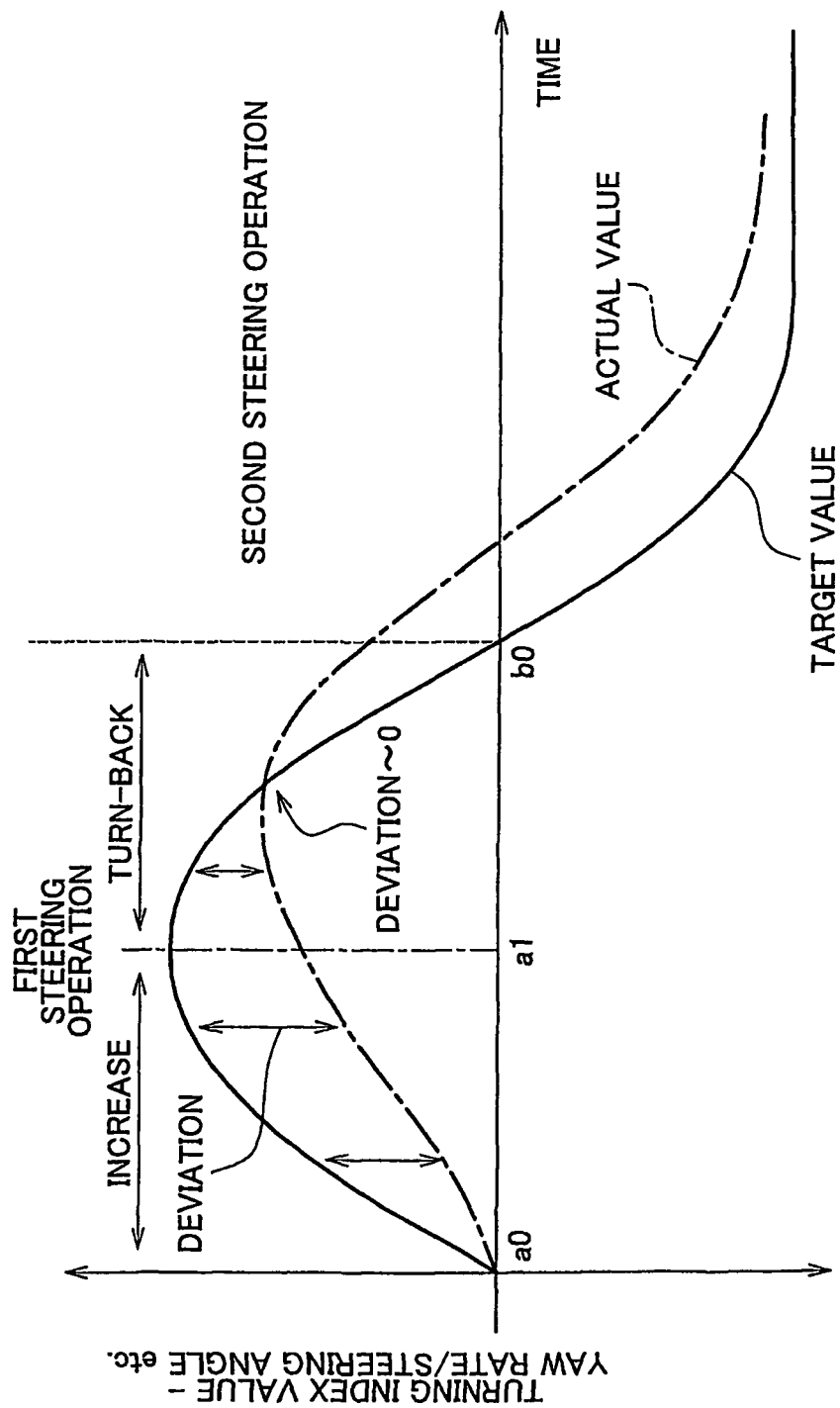
FIG. 5B shows an example of variation in a target value (requested value) and an actual value of a turning index value when an attempt is made to execute the travel shown in FIG. 5A through emergency steering.

For example, when emergency steering is executed in the vehicle 10 to avoid a forward obstacle while traveling along a travel route such as that shown in FIG. 5A, the driver typically varies the steering angle in one direction (a first steering operation) and then varies the steering angle in an opposite direction (a second steering operation). In this case, the target value of the turning index value, such as the yaw rate, lateral acceleration, or the wheel angle corresponding to the steering input to the vehicle (the steering angle), increases (the steering angle during the first steering operation is increased) between the time a0 to the time a1, as shown by the solid line in FIG. 5B, then decreases (the steering angle during the first steering operation is turned back) between the time a1 to the time b0 in order to reverse the turning direction of the vehicle, and then increases in an opposite direction to the first steering operation from the time b0. Meanwhile, the actual value of the yaw rate, lateral acceleration, wheel angle, and so on varies at a delay relative to the target value, as shown by the dot-dash line in the drawing. The state of the vehicle when the vehicle actually travels along the route shown in FIG. 5A varies in accordance with the actual value of the yaw rate, lateral acceleration, wheel angle, and so on (the dot-dash line in FIG. 5B), and therefore, strictly speaking, the turn-back in the steering input of the vehicle, which is performed at the time a1 during the first steering operation, and the increase performed at the time b0 of the second steering operation are executed prior to the corresponding times in FIG. 5A. In other words, during emergency avoidance steering, steering is executed at a greater amplitude than normal in order to turn the vehicle as quickly as possible.

In the behavior control apparatus for applying a deceleration force to the vehicle based on the deviation between the target value and the actual value of the turning index value, the deviation between the target turning index value and the actual turning index value increases during the period of the first steering operation in which the steering input of the vehicle is subjected to a steering angle increase, and therefore deceleration is executed on the vehicle. However, from the point a1, at which the steering switches to a turn-back, to the start of input of the second steering operation, the deviation between the target value and the actual value of the turning index value decreases such that in a period where the magnitude of the actual value exceeds the magnitude of the target value, the deceleration force is substantially zero (i.e., when the actual value exceeds the target value, the deceleration according to this control is not executed).

Hence, when emergency avoidance steering is performed, as shown in the drawings, and the magnitude of the deviation between the target turning index value and the actual turning index value appears to decrease in the first steering operation due to a response delay in the actual turning index value such that the target deceleration is determined based on this deviation alone, regardless of whether the vehicle is currently in a traveling state in which excessive centrifugal force may be applied, a situation in which the speed of the vehicle is not reduced sufficiently may arise. When the steering angle is then switched to an opposite direction at the time b0, a centrifugal force corresponding to the insufficiently reduced vehicle speed and the steering angle acts on the center of gravity of the vehicle in conjunction with a reverse jolt corresponding to the amount of roll toward the outer side of the turn generated during the first steering operation, and as a result, increased roll may occur toward the outer side of the turn during the second steering operation.

In other words, if the response delay in the actual turning index value relative to the target turning index value increases significantly, for example during emergency avoidance steering, the deviation between the actual and target turning index values may no longer be used as an index for determining whether the vehicle is in a condition where excessive centrifugal force is being applied to the vehicle. Hence, due to this response delay in the actual turning index value, excessive roll of the vehicle cannot be suppressed, or in other words, the effects of the behavior control is less effective.

Therefore, in order to suppress excessive roll of the vehicle even when a response delay exists in the actual turning index value, the control apparatus of this embodiment determines whether excessive centrifugal force is being applied by referencing an index value that represents the roll state of the vehicle. When it is determined that excessive centrifugal force is being applied, a correction is applied to the deceleration control by reducing the magnitude of a target deceleration decrease gradient, which is determined based on the deviation between the target turning index value and the actual turning index value, thereby extending deceleration of the vehicle such that the vehicle speed is reduced sufficiently.

FIG. 1B shows the constitution of an operation and the control of the apparatus. FIG. 1B illustrates this embodiment in the form of a control function block diagram. The control executed by the control apparatus is implemented through a program stored in the electronic control unit 60 shown in FIG. 1A. The operation of the control apparatus is executed constantly while the vehicle is in motion.

Referring to FIG. 1B, this embodiment includes the following control regions: (1) a region (60a to 60g) for determining a target deceleration ($\Delta\gamma$ deceleration: $\alpha D\_\Delta\gamma$) corresponding to the deviation between the target turning index and the actual turning index; (2) a region (60i) for determining a target deceleration (driver-requested deceleration: $\alpha D\_\theta b$) corresponding to the depression amount $\theta b$ of the brake pedal; (3) a region (60j) for determining a target yaw moment Mt for controlling the yaw behavior of the vehicle by generating a yaw moment in the vehicle; (4) a region (60k) for determining a target deceleration (YM deceleration: $\alpha D\_YM$) during realization of the target yaw moment; (5) a target deceleration selection region (60l) for comparing the aforementioned three target deceleration values and selecting the largest target deceleration as the final target deceleration; and (6) a region (60m) for determining a braking force distribution to each wheel based on the final target deceleration $\alpha Dt$ determined in the target deceleration selection region 60l and the target yaw moment determined in the target yaw moment determination region 60j. In other words, in the control apparatus shown in the drawings, the braking force distribution to each wheel is determined in any appropriate conventional manner based on the final target deceleration $\alpha Dt$, which is selected from the $\Delta\gamma$ deceleration $\alpha D\_\Delta\gamma$, the driver-requested deceleration $\alpha D\_\theta b$, and the YM deceleration $\alpha D\_YM$, and the target yaw moment Mt. A control command is then transmitted to the hydraulic circuit 46 in accordance with the determined braking force distribution of each wheel, whereupon the braking device of each wheel is activated to generate the braking force. Although not shown in the drawings, a portion of the braking force may be applied through engine braking, regenerative braking, and so on generated by the driving system device of the vehicle. A reduction amount guard $60h$ may be disposed arbitrarily.

In the constitution described above, the target yaw moment Mt, YM deceleration $\alpha D\_YM$, and driver-requested deceleration $\alpha D\_\theta b$ may be determined using any conventional method known to a person skilled in the art. For example, the target yaw moment Mt may be calculated based on the steering angle, the yaw rate deviation (which may be similar to that described below), yaw acceleration, a slip angle of the vehicle, lateral acceleration, the vehicle speed, the wheel speed of each wheel, and the specifications of the vehicle, for example, in accordance with appropriate calculations employed in a pre-existing, VSC (Vehicle Stability Control) system or VDIM (Vehicle Dynamical Integrated Management) system. The YM deceleration $\alpha D\_YM$ is then obtained from the calculated target yaw moment Mt using the equation $\alpha D\_YM = Mt/(Tr/2)$ . . . (1). Note that Tr is a tread length (see FIG. 3A). Further, the driver-requested deceleration $\alpha D\_\theta b$ may be a value that is obtained by multiplying a conversion factor $k_B$, which may be set in any appropriate conventional form, by the brake pedal depression amount θb in accordance with the equation $\alpha D\_\theta b = k_B \times \theta b$.

Next, determination of the $\Delta\gamma$ deceleration and limit processing performed on the decrease gradient thereof will be described. In the example shown in the drawing, the yaw rate is used as the turning index value during determination of the $\Delta\gamma$ deceleration $\alpha D\_\Delta\gamma$ (note that the wheel angle or the lateral acceleration may be used instead). More specifically, the value of the $\Delta\gamma$ deceleration $\alpha D\_\Delta\gamma$ may be obtained from a yaw rate deviation $\Delta\gamma$ using a map such as that shown in FIG. 2A, for example ($60d$). The yaw rate deviation $\Delta\gamma$ is obtained from a target yaw rate γt and an actual yaw rate γa using the equation $\Delta\gamma = \text{sgn}(\gamma t) \times (\gamma t - \gamma a)$ . . . (2), where sgn (γt) is a function ($=\pm 1$) that represents the sign of the yaw rate target value γt. In other words, the yaw rate deviation $\Delta\gamma$ takes a value obtained by subtracting the actual yaw rate from the target yaw rate when the direction of the target yaw rate value γt is set as the positive. Accordingly, if $\Delta\gamma > 0$, the magnitude of the target yaw rate exceeds the magnitude of the actual yaw rate, and therefore the control apparatus determines that the vehicle is in an understeer condition.

The target yaw rate γt used to determine the $\Delta\gamma$ deceleration $\alpha D\_\Delta\gamma$ as described above is typically obtained from $\gamma t = (Vx/l)\delta$ . . . (3) ($60a$). Here, Vx, l and δ are values obtained by converting the vehicle speed, the front-rear wheel inter-axle distance, and the steering angle, respectively, into a wheel angle. The vehicle speed Vx may be obtained by any appropriate method, for example by determining the average value of the wheel speed of all of the wheels or the driven wheels, which may be calculated from the wheel speed of each wheel detected by a wheel speed sensor ($60b$). Note that here, the target yaw rate γt represents the steering angle and the amount of the turn requested by the driver, which is determined according to the vehicle speed.

Meanwhile, the actual yaw rate γa is obtained from $\gamma a = Gy/Vx$ . . . (4) ($60c$). Here, Gy $62$ is the lateral acceleration detected by a lateral acceleration sensor. Note that if the vehicle is provided with a yaw rate sensor, the detected yaw rate may be used.

Figure 2A:
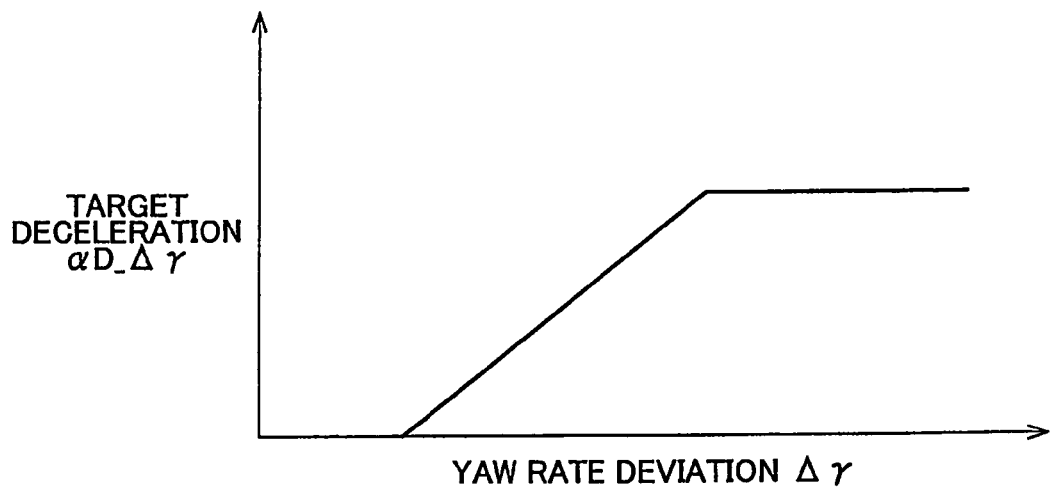
FIG. 2A is a map for determining a target deceleration (Δγ deceleration) using a yaw rate deviation as a parameter in the behavior control apparatus according to an embodiment of the present invention.

According to the $\Delta\gamma$ deceleration $\alpha D\_\Delta\gamma$ obtained in this manner, as is evident from the map shown in FIG. 2A, the vehicle is decelerated when the yaw rate deviation $\Delta\gamma$ is positive, or in other words when the magnitude of the target yaw rate is greater than the magnitude of the actual yaw rate. However, when the steering direction is changed rapidly, the yaw rate deviation $\Delta\gamma$ may appear to decrease, as described above. Hence, in the control of this embodiment, the reduction amount guard $60g$ is provided, and the roll state of the vehicle is referenced independently of the yaw rate deviation $\Delta\gamma$ such that when the roll state of the vehicle is large, the value of the $\Delta\gamma$ deceleration $\alpha D\_\Delta\gamma$ is corrected to reduce the decrease gradient (rate of change) of the $\Delta\gamma$ deceleration $\alpha D\_\Delta\gamma$.

Figure 2B:
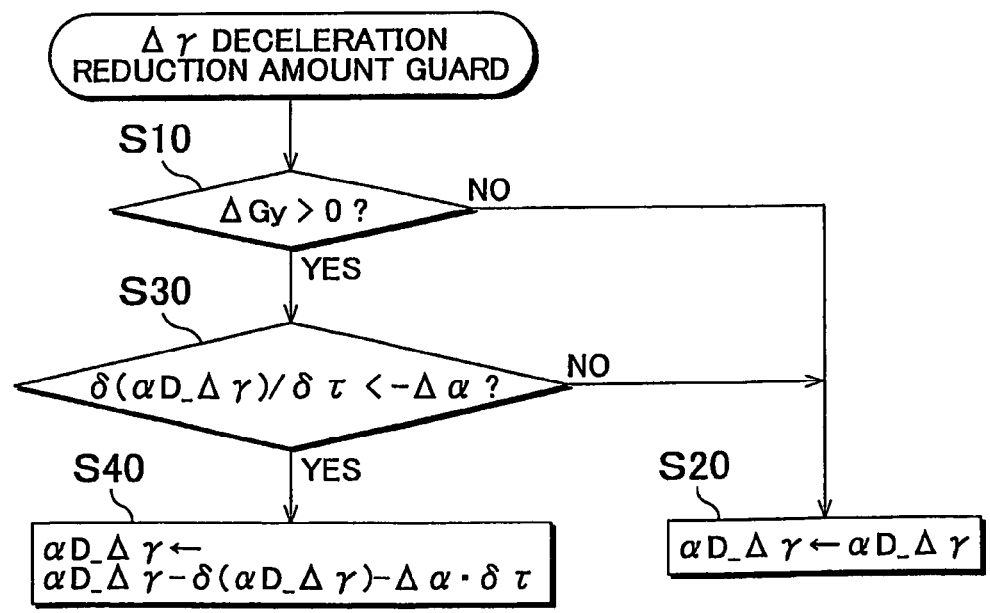
FIG. 2B is a flowchart depicting the internal processing of a reduction amount guard for reducing a decrease gradient of the Δγ deceleration.

FIG. 2B illustrates the process performed in the reduction amount guard $60g$ to correct the $\Delta\gamma$ deceleration $\alpha D\_\Delta\gamma$ in the form of a flowchart. In this process, a determination is first made as to whether an index value representing the roll state (roll motion index value) has exceeded a threshold roll index value (step $10$). Note that in the example in the drawing, the lateral acceleration Gy $62$ is referenced as the roll motion index value, but any other quantity from which the value of the centrifugal force acting on the vehicle can be estimated may be used. For example, when the vehicle is provided with a roll sensor, a roll angle or a roll rate of the vehicle may be referenced, and when each wheel is provided with a vertical load sensor, a vertical load difference or a vertical load ratio between the left and right wheels may be referenced. The steering angle, the steering angle velocity, or the yaw rate may also be referenced. When a yaw rate sensor is provided, the lateral acceleration Gy $62$ may be obtained from $Gy = \gamma a \times Vx$.

Figure 3A:
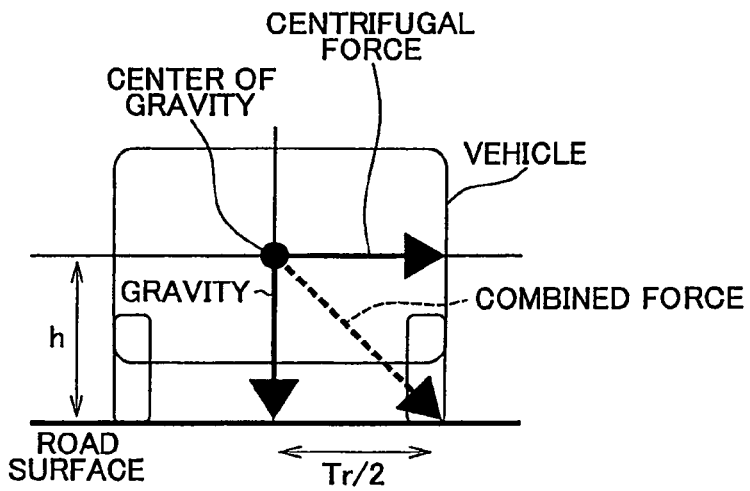
FIG. 3A, is a schematic diagram depicting the longitudinal view of the vehicle, illustrating calculation of a static overturning rollover threshold acceleration.

When determining the lateral acceleration Gy $62$ in the step $10$, a difference $\Delta Gy$ ($= |Gy| - Gth$) between an absolute value of the lateral acceleration Gy $62$ and a threshold roll motion index value Gth is calculated by the comparator $60f$, as shown in FIG. 1B. The threshold roll motion index value Gth may be set lower than a static rollover threshold acceleration by an arbitrary predetermined width, taking vehicle safety into account. As shown in FIG. 3A, the static rollover threshold acceleration is the lateral acceleration limit at which the direction of a combined force of centrifugal force and gravity begins to shift to the outer side of the vehicle, and is obtained from $(Tr/2)/h \times g$ (where h and g represent the height of the gravitational center and gravitational acceleration, respectively). The reason for this is that when the combined force shifts further to the side of the vehicle, the likelihood that a rollover may occur increases. When a quantity other than the lateral acceleration is used as the roll motion index value, the static rollover threshold acceleration may be converted into the value employed as the roll motion index value such that the threshold roll motion index value is determined based on the converted value.

When $\Delta Gy$ is negative (NO in step $10$), it is determined that the lateral acceleration (the roll motion index value) is not excessive, and accordingly that a rollover is unlikely to occur. Hence, the $\Delta\gamma$ deceleration $\alpha D\_\Delta\gamma$ is not corrected, and the value calculated in the $\Delta\gamma$ deceleration determination region $60d$ is used as is in the subsequent processing as the $\Delta\gamma$ deceleration $\alpha D\_\Delta\gamma$ (step $20$).

When $\Delta Gy$ is positive (YES in step $10$), on the other hand, it is determined that the lateral acceleration is excessive, and accordingly that the roll motion of the vehicle body may be excessive. Hence, when the $\Delta\gamma$ deceleration $\alpha D\_\Delta\gamma$ decreases, a limit is applied to the decrease gradient thereof such that the decrease gradient is set to be small (S$40$).

More specifically, for example, first a determination is made as to whether a temporal rate of change $\delta(\alpha D\_\Delta\gamma)/\delta\tau$ in $\alpha D\_\Delta\gamma$ per predetermined time period $\delta\tau$ is smaller than a predetermined value $-\Delta\alpha$ (step $30$). Here, $\Delta\alpha$ is a positive predetermined value. Therefore, when the rate of change $\delta(\alpha D\_\Delta\gamma)/\delta\tau$ is positive, or in other words when the $\Delta\gamma$ deceleration increases, or when $\delta(\alpha D\_\Delta\gamma)/\delta\tau < 0$ (i.e. when the $\Delta\gamma$ deceleration is decreasing) but the variation gradient thereof is small, a negative determination is made in the step 30. In this case, the Δγ deceleration αD_Δγ is not corrected, and the value calculated in the Δγ deceleration determination region 60d is used as is in the subsequent processing as the Δγ deceleration αD_Δγ (step 20). When δ(αD_Δγ)/δτ<−Δα is established (YES in S30), on the other hand, the decrease gradient of the Δγ deceleration is limited to Δα (S40).

In this case, the value of the Δγ deceleration having the limited decrease gradient is corrected to αD_Δγ←αD_Δγ−δ (αD_Δγ)−Δα×δτ . . . (5) (S40). Note that δ(αD_Δγ) is a value obtained by subtracting the value obtained in Equation (5) prior to the time period δτ from the newest value calculated in the Δγ deceleration determination region 60d. The control processing of FIG. 2B is normally executed at predetermined intervals, and therefore δτ may correspond to the control period. As the Δγ deceleration decreases, δ(αD_Δγ) becomes negative, and therefore the value obtained in Equation (5) decreases by Δα×δτ from the previous value. Note that the decrease gradient may be reduced by adding a first-order lag of an output value of the Δγ deceleration determination region 60d only during a decrease period, performing moderating processing, and so on, for example, instead of limiting the decrease gradient in the manner described above.

Figure 3B:
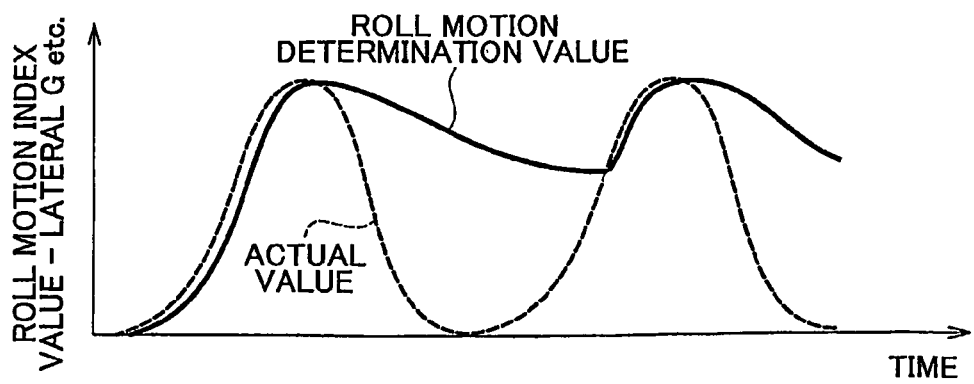
FIG. 3B shows an example of temporal variation in a roll motion index value and a roll motion determination value obtained by reducing a decrease gradient of the roll motion index value (i.e. making the decrease gradient more likely to increase and less likely to decrease)

Incidentally, when determining ΔGy according to the example described above, an absolute value of an instantaneous value of the roll motion index value is used as is. However, instantaneous values of the lateral acceleration and so on may decrease transiently or vary in the vicinity of the threshold roll motion index value. In such cases, chattering may occur during the determination of ΔGy. To avoid this situation, a value obtained by implementing reduction amount guard processing (60h) on the roll motion index value, or in other words a value (a roll motion determination value) that increases together with the roll motion index value but is unlikely to decrease when the roll motion index value decreases, as shown in FIG. 3B, may be used to calculate ΔGy instead of the absolute value of an instantaneous value of the roll motion index value. The roll motion determination value may be obtained by applying a limit only to the decrease gradient, similarly to the processing of the reduction amount guard 60g, or by adding a first-order lag value of the roll motion index value, performing moderating processing, and so on.

Selection of the final target deceleration will now be described. As noted above, in the control of this embodiment, the largest value of the Δγ deceleration αD_Δγ, the driver-requested deceleration αD_θb, and the YM deceleration αD_YM is selected in the target deceleration selection region 60l and used to determine the braking force distribution of each wheel. In the target deceleration selection region 60l, the final target deceleration αDt is obtained from αDt←Max {αD_Δγ, αD_θb, αD_YM} . . . (6). Here, Max is an operator for selecting the largest value of the values in parentheses.

Figure 4A:
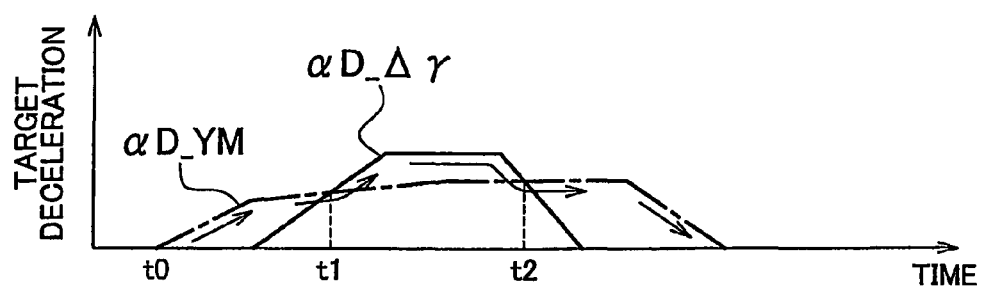
FIG. 4A shows an example of temporal variation in a target deceleration applied during a normal turn in which the roll motion index value does not exceed a reference value in the behavior control apparatus according to an embodiment of the present invention.
Figure 4B:
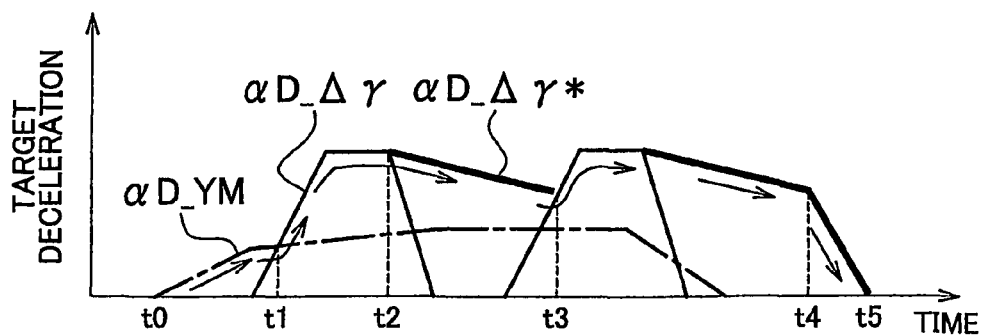
FIG. 4B shows an example of temporal variation in the target deceleration when the roll motion index value exceeds the reference value such that excessive rolling may occur, in the behavior control apparatus according to an embodiment of the present invention.

FIGS. 4A and 4B show examples of temporal variation in αD_Δγ, αD_YM, and the final target deceleration obtained from Equation (6) while the behavior control of the vehicle is executed. Note that in the drawings, the thin solid lines denote the value of αD_Δγ before the processing of the reduction amount guard 60g, while the thick solid lines denote the value of αD_Δγ after the processing of the reduction amount guard 60g (indicated in FIGS. 4A and 4B as αD_Δγ*). Further, the thin line arrows in the drawings denote the transition direction of the final target deceleration. The dot-dash lines in the drawings denote the YM deceleration for realizing the target yaw moment. The thin solid lines denote the Δγ deceleration determined according to the yaw rate deviation, the decrease gradient of which has not been limited, while the thick solid lines denote the Δγ deceleration determined according to the yaw rate deviation following limitation of the decrease gradient thereof. FIG. 4A shows an example of a normal turn in which the roll motion index value does not exceed the threshold roll motion index value, while FIG. 4B shows an example of conditions in which the roll motion index value exceeds the threshold roll motion index value such that excessive roll may occur. The largest deceleration is selected as the final target deceleration. Referring to the drawings, during a normal turn, or in other words when ΔGy<0, αD_YM is selected while αD_YM exceeds αD_Δγ (t0 to t1), and when αD_Δγ increases thereafter (t1 to t2), αD_Δγ is selected, as shown in FIG. 4A. When αD_Δγ subsequently decreases, the final target deceleration decreases in accordance with this decrease.

On the other hand, when the roll motion index value or the roll motion determination value exceeds the threshold roll motion index value (ΔGy>0) such that centrifugal force or roll motion may become excessive, αD_Δγ is selected when αD_Δγ increases (t1 to t2), as shown in FIG. 4B, and when αD_Δγ calculated in the Δγ deceleration determination region 60d decreases, the decrease gradient thereof is reduced by the reduction amount guard, as shown by the thick solid lines, thereby preventing a rapid reduction in the deceleration and ensuring that deceleration continues.

Hence, the speed of the vehicle is reduced even when the yaw rate deviation Δγ decreases such that centrifugal force or roll motion may become excessive, as shown by the section extending from a1 to b0 in FIG. 5B, for example. As a result, it is to be expected that yaw behavior destabilization and excessive roll motion will be suppressed even if the steering angle switches to the opposite direction from the time b0 onward. When the roll motion index value or the roll motion determination value subsequently falls below the threshold roll motion index value, or in other words when ΔGy>0 is no longer established (t4), the limit on the decrease gradient of the deceleration is released such that deceleration is reduced rapidly (at a manageable rate in terms of the control) (t4 to t5).

An embodiment of the present invention was described in detail above, but various modifications may be made to the embodiment that remain within the scope of the present invention.

For example, in the embodiment described above, the vehicle is decelerated when the target value of the turning index value exceeds the actual turning index value, but deceleration may be executed whenever a deviation occurs. In this case, the deceleration is determined in accordance with an absolute value of the deviation between the target value and the actual value of the turning index value (defined as Δγ=|γt−γa| in Equation (2), for example), and when the roll motion index value exceeds the determination threshold roll motion index value, the deceleration control is corrected such that deceleration is unlikely to decrease even if the absolute value of the deviation decreases.

Further, in the embodiment described above, correction of the deceleration control based on the determination of the roll motion index value is executed to suppress excessive rolling effectively during the second steering operation, but it is to be understood that correction of the deceleration control is also effective in suppressing excessive rolling during the first steering operation. Moreover, correction of the deceleration control based on determination of the roll motion index value may also be applied to the target deceleration when realizing the target yaw moment.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vehicle behavior control apparatus comprising:
a deceleration control portion that decelerates the vehicle to reduce a deviation between a target turning index value, and an actual turning index value of the vehicle, the target turning index value being determined based on a steering angle of the vehicle, wherein
the deceleration has a first gradient of decrease when a roll motion index value of the vehicle is below a threshold roll motion index value,
the deceleration has a second gradient of decrease, that is smaller than the first gradient of decrease, when the roll motion index value of the vehicle exceeds the threshold roll motion index value,
the deceleration control portion decelerates the vehicle to reduce the deviation between the target turning index value and the actual turning index value by correcting a target value of the deceleration so as to keep a rate of change in the deceleration per predetermined time period smaller than a predetermined value that is smaller than a rate of change in the deceleration when the roll motion index does not exceed the threshold roll motion index,
the target turning index value is at least one value selected from the group consisting of a yaw rate of the vehicle, a wheel angle, and a lateral acceleration, wherein the yaw rate is determined based on the steering angle and a vehicle speed, and the wheel angle is an angle of a left or right wheel of the vehicle, and
the actual turning index value is a turning index value that is actually detected or estimated, and which corresponds to the target turning index value of the vehicle.

2. The vehicle behavior control apparatus according to claim 1, wherein the roll motion index value is at least one value selected from a group consisting of the lateral acceleration of the vehicle, a vertical load difference or a vertical load ratio between left and right wheels of the vehicle, a roll angle of the vehicle, a roll rate, the steering angle of the vehicle, a steering angle velocity, the target turning index value, and the actual turning index value, which are actually detected or estimated in the vehicle.

3. The vehicle behavior control apparatus according to claim 1, wherein:
the roll motion index value is a roll motion determination value that changes with the magnitude of at least one value selected from a group consisting of the lateral acceleration of the vehicle, a vertical load difference or a vertical load ratio between left and right wheels of the vehicle, a roll angle of the vehicle, a roll rate, the steering angle of the vehicle, a steering angle velocity, the target turning index value, and the actual turning index value, which are actually detected or estimated in the vehicle; and
a rate of change in the roll motion determination value relative to the rate of change in the value selected from the group is smaller when the selected value decreases than when the selected value increases.

4. The vehicle behavior control apparatus according to claim 1, wherein the threshold roll motion index value is determined based on a static rollover threshold acceleration of the vehicle.

5. The vehicle behavior control apparatus according to claim 1, wherein the deceleration control portion decelerates the vehicle when the target turning index value is larger than the actual turning index value.

6. The vehicle behavior control apparatus according to claim 1, wherein the deceleration control portion decelerates the vehicle when it is determined that the vehicle is understeering based on the deviation between the target turning index value and the actual turning index value.

7. The vehicle behavior control apparatus according to claim 1, further comprising a yaw moment control portion that controls a yaw moment of the vehicle based on a target yaw moment calculated to stabilize yaw behavior of the vehicle,
wherein the deceleration control portion selects a deceleration having the larger magnitude, between the deceleration generated to reduce the deviation between the target turning index value and the actual turning index value, and a yaw moment generating deceleration for generating the target yaw moment, as the deceleration to be generated in the vehicle.

8. The vehicle behavior control apparatus according to claim 7, wherein the deceleration control portion selects a deceleration having the largest magnitude, from among the deceleration generated to reduce the deviation between the target turning index value and the actual turning index value, the yaw moment generating deceleration for generating the target yaw moment, and a driver-requested deceleration requested by a driver of the vehicle, as the deceleration to be generated in the vehicle.

9. The vehicle behavior control apparatus according to claim 1, wherein the decrease gradient of the deceleration when an absolute value of the roll motion index value exceeds the threshold roll motion index value is smaller than a decrease gradient when the absolute value of the roll motion index value does not exceed the threshold roll motion index value.

10. The vehicle behavior control apparatus according to claim 1, wherein:
the roll motion index value is a rolling state determination value; and
the roll motion determination value increases when the roll motion index value increases but decrease at a lower rate than a rate of decrease of the roll motion index value when the roll motion index value decreases.

11. The vehicle behavior control apparatus according to claim 1, wherein the decrease gradient of the deceleration when a roll motion index value of the vehicle exceeds a threshold roll motion index value is decreased with respect to the decrease gradient when the roll motion index value does not exceed the threshold roll motion index value by applying a lag to the deceleration during the decrease in deceleration.

12. The vehicle behavior control apparatus according to claim 11, wherein the lag is applied to the deceleration only during the decrease in deceleration.

13. The vehicle behavior control apparatus according to claim 1, wherein the deceleration control portion corrects the target value of the deceleration independently of a user acceleration request.

14. A vehicle behavior control apparatus comprising:
a deceleration control portion that decelerates the vehicle to reduce a deviation between a target turning index value, and an actual turning index value of the vehicle, the target turning index value being determined based on a steering angle of the vehicle, wherein the deceleration has a first gradient of decrease when a roll motion index value of the vehicle equals a threshold reference roll index value, the deceleration has a second gradient of decrease, that is smaller than the first gradient of decrease, when the roll motion index value deviates from the threshold reference roll index value, the deceleration control portion decelerates the vehicle to reduce the deviation between the target turning index value and the actual turning index value by correcting a target value of the deceleration so as to keep a rate of change in the deceleration per predetermined time period smaller than a predetermined value that is smaller than a rate of change in the deceleration when the roll motion index does not exceed the target roll motion index value, the target turning index value is at least one value selected from the group consisting of a yaw rate of the vehicle, a wheel angle, and a lateral acceleration, wherein the yaw rate is determined based on the steering angle and a vehicle speed, and the wheel angle is an angle of a left or right wheel of the vehicle, and the actual turning index value is a turning index value that is actually detected or estimated, and which corresponds to the target turning index value of the vehicle.

15. The vehicle behavior control apparatus according to claim 14, wherein the deceleration is determined based on the deviation between the target turning index value and the actual turning index value.

16. A vehicle behavior control method comprising:

decelerating, by an electronic controller, the vehicle to reduce a deviation between a target turning index value, and an actual turning index value of the vehicle, the target turning index value being determined based on a steering angle of the vehicle, wherein the deceleration is performed according to a first gradient of decrease when a roll motion index value of the vehicle is below a threshold roll motion index value, the deceleration is performed according to a second gradient of decrease, that is smaller than the first gradient of decrease, when the roll motion index value of the vehicle exceeds the threshold roll motion index value, reducing, by the electronic controller, the deviation between the target turning index value and the actual turning index value by correcting a target value of the deceleration so as to keep a rate of change in the deceleration per predetermined time period smaller than a predetermined value that is smaller than a rate of change in the deceleration when the roll motion index value does not exceed the threshold roll motion index value, the target turning index value is at least one value selected from the group consisting of a yaw rate of the vehicle, a wheel angle, and a lateral acceleration, wherein the yaw rate is determined based on the steering angle and a vehicle speed, and the wheel angle is an angle of a left or right wheel of the vehicle, and the actual turning index value is a turning index value that is actually detected or estimated, and which corresponds to the target turning index value of the vehicle.

17. The vehicle behavior control method according to claim 16, wherein the deceleration is determined based on the deviation between the target turning index value and the actual turning index value.

18. A vehicle behavior control apparatus comprising:

a deceleration control portion that decelerates the vehicle to reduce a deviation between a target turning index value, and an actual turning index value of the vehicle, the target turning index value being determined based on a steering angle of the vehicle, wherein the deceleration has a first gradient of decrease when a roll motion index value of the vehicle is below a threshold roll motion index value, the deceleration has a second gradient of decrease, that is smaller than the first gradient of decrease, when the roll motion index value of the vehicle exceeds the threshold roll motion index value, the deceleration is determined based on the deviation between the target turning index value and the actual turning index value, the deceleration control portion decelerates the vehicle to reduce the deviation between the target turning index value and the actual turning index value by correcting a target value of the deceleration so as to keep a rate of change in the deceleration per predetermined time period smaller than a predetermined value that is smaller than a rate of change in the deceleration when the roll motion index value does not exceed the target roll motion index value, the target turning index value is at least one value selected from the group consisting of a yaw rate of the vehicle, a wheel angle, and a lateral acceleration, wherein the yaw rate is determined based on the steering angle and a vehicle speed, and the wheel angle is an angle of a left or right wheel of the vehicle, and the actual turning index value is a turning index value that is actually detected or estimated, and which corresponds to the target turning index value of the vehicle.

* * * * *